(12) United States Patent (10) Patent No.: US 8,903,767 B2
Krasensky et al. (45) Date of Patent: Dec. 2, 2014

(54) METHOD, SYSTEM AND COMPUTER PROGRAM PRODUCT FOR SEQUENCING ASYNCHRONOUS MESSAGES IN A DISTRIBUTED AND PARALLEL ENVIRONMENT

(75) Inventors: Nicolas Krasensky, Cagnes sur Mer (FR); Clement Seveillac, Cannes (FR); Didier Spezia, Nice (FR); Pierre Dor, Vence (FR)

(73) Assignee: Amadeus S.A.S., Biot (FR)

( * ) Notice: Subject to any disclaimer, the term of this patent is extended or adjusted under 35 U.S.C. 154(b) by 236 days.

(21) Appl. No.: 13/565,284

(22) Filed: Aug. 2, 2012

(65) Prior Publication Data
US 2014/0040194 A1 Feb. 6, 2014

(51) Int. Cl.
*G06F 17/30* (2006.01)

(52) U.S. Cl.
USPC .......................................................... 707/613

(58) Field of Classification Search
CPC ............................................... G06F 17/30578
USPC .......................................................... 707/613
See application file for complete search history.

(56) References Cited

U.S. PATENT DOCUMENTS 5,588,117 A 12/1996 Karp et al.
7,917,503 B2 * 3/2011 Mowatt et al. ................ 707/723
7,991,847 B2 8/2011 Cadoret et al.
8,392,925 B2 * 3/2013 Ramesh et al. ............... 718/102
2007/0192306 A1 * 8/2007 Papakonstantinou et al. .... 707/5
2008/0127208 A1 * 5/2008 Bedi et al. ..................... 719/313
2008/0127209 A1 * 5/2008 Gale et al. ..................... 719/313
2012/0144365 A1 * 6/2012 Chrysanthakopoulos et al. ............................. 717/107

FOREIGN PATENT DOCUMENTS

EP 2254046 A1 11/2010
WO 03071435 A1 8/2003
WO 2012051366 A2 4/2012

OTHER PUBLICATIONS

European Patent Office, extended Search Report issued in related European application No. 12 36 8017 dated Jan. 16, 2013.

* cited by examiner

*Primary Examiner* — Noosha Arjomandi
(74) *Attorney, Agent, or Firm* — Wood, Herron & Evans, LLP

(57) ABSTRACT

System and method of sequencing distributed asynchronous messages. An inbound handler receives an incoming message with a sequence correlation value that identifies a sequence comprising the incoming message, and checks for a sequence status of the sequence. If the sequence status indicates that none of multiple outbound handlers is currently processing a message for the sequence and if the incoming message is the next message to be processed for the sequence, then the incoming message is forwarded to a queue storage and subsequently forwarded to an available outbound handler. If the sequence status indicates that at least one of the outbound handlers is currently processing a message of the sequence, if the queue storage already comprises a message to be processed for the sequence, or if the incoming message is not the next message to be processed for the sequence, then the incoming message is stored in overflow storage.

28 Claims, 12 Drawing Sheets

METHOD, SYSTEM AND COMPUTER PROGRAM PRODUCT FOR SEQUENCING ASYNCHRONOUS MESSAGES IN A DISTRIBUTED AND PARALLEL ENVIRONMENT

TECHNICAL FIELD

The present invention relates generally to data and information processing for communication systems, and more particularly to a method, an apparatus and a system for processing asynchronous messages of a sequence in a distributed and parallel processing environment.

BACKGROUND

In a service call or event processing, using a distributed software architecture, the transmission of messages may be either synchronous or asynchronous. The messages are distributed and multicast with full recipient isolation wherein each multicast message is processed independently from each other.

FIG. 1 shows a synchronous transmission of messages or service calls between two systems, on one side a calling system 110 and on the other side a remote system 120, wherein the calling system 110 controls the order of the message processing. In this case, the calling system 110 is waiting for the result of remote processing; as a consequence the caller is the master regarding the order in which messages are actually processed on a server system or the remote system.

A transmission 111 of a first message A from the calling system 110 is processed in the remote system 120 and followed by a message A processed 121 returned to the calling system 110. Once the message A processed is received, the calling system 110 can start a transmission 113 of a second message B to the remote system 120. The second message B is then processed in the remote system 120 and a message B processed 123 is returned to the calling system 110.

In this exemplary flow diagram, the chronological processing of the synchronous calls or messages between the calling system 110 and the remote system 120 shows that the process 112 of the first message A by the server system or the remote system 120 occurs before the process 114 of the second message B.

FIG. 2 shows an asynchronous transmission of messages or service calls between a calling system 210 and a server system or a remote system 220, wherein the calling system 210 sends a service call or message to the server system or a remote system 220 which will then processes the message based on its own scheduling. The client system or the calling system 210 is loosing control of the timing of the message processing.

A transmission 211 of a first message A from the calling system 210 is processed in the remote system 220. In the meantime, the calling system 210 has started a transmission 213 of a second message B to the remote system 220. The second message B is then processed in the remote system 220 and it cannot be determined whether a message B processed is returned to the calling system 210 before a message A processed.

In this exemplary flow diagram, the chronological processing of the asynchronous calls or messages between the calling system 210 and the remote system 220 shows that the process 212 of the first message A by the server system or the remote system 220 occurs more or less at the same time as the process 214 of the second message B. It would also be possible that the second message B is processed before the first message A, which could severely impact the relevancy of the sequence containing messages A and B.

FIG. 3 is an exemplary flow diagram showing a parallel processing of service calls or messages in a distributed system. In distributed systems, to comply with the resilience and scalability requirements, service calls or messages are processed in parallel by instantiation and/or in multithreading. In this figure, Instances 1, 2, 3, . . . , and n, referred as 310-1, 310-2, . . . and 310-$n$ of the process system are processing four messages 1, 2, 3 and 4 in the message queue 340 with an inbound sequence.

Parallelized processes do not guarantee the order in which consecutive service calls or messages will be processed and finalized. However, service calls or message processes sometimes require strong enforcement of a sequence between correlated events or messages.

Therefore, message 2 is processed first, followed by message 1, then message 4 and finally message 3. This is an inconsistent transactional processing order.

In this figure, the sequence refers to the order in which the service calls or messages are to be conveyed and/or processed by the distributed system. This order is generally driven by the business process or an industry standard. By not respecting this order, the outcome results in inadequate processing and in the worst case in irreversible corruption of the stored functional data, also called database corruption.

FIG. 4 is an exemplary flow diagram showing a parallel processing of asynchronous calls or messages in a distributed process system which results in a risk of de-ordering the processing of messages and corrupted data.

In a synchronous environment, the sequencing is ensured by the emitter system or the calling system which initiates the messages to the remote system one after the other, controlling de facto the sequence flow between correlated messages.

This sequencing becomes impossible when the emitter system or the calling system 410 has to deal with asynchronous and distributed processes, as it is incapable to determine the end of the processing of a message on the remote system 420. FIG. 4 shows this risk where a transmission 411 of a first message A from the calling system 410 to the remote system 420 is followed by a transmission 413 of a second message B. The process 414 of the second message B starts before the process 412 of the process 414 of the first message A. Therefore, the message processing may be inversed, which results in inadequate processing and in the worst case in irreversible corruption of the stored functional data, or database corruption.

Therefore the present invention aims to mitigate the aforementioned problem and to avoid any irreversible corruption of the stored functional data, or any database corruption.

SUMMARY

In one embodiment, the invention provides a computer-implemented method of sequencing distributed asynchronous messages in a distributed and parallel system having a plurality of inbound handlers and a plurality of outbound handlers, the method comprising the following steps performed with at least one data processor:
receiving in an inbound handler an incoming message with a sequence correlation value that identifies a sequence comprising the incoming message, checking for a sequence status of said sequence in a sequence storage;
determining if the incoming message is the next message to be processed for maintaining the order of the messages in said sequence;

if the sequence status indicates that none of the outbound handler is currently processing a message for said sequence and if the incoming message is determined to be the next message to be processed for said sequence, then forwarding the incoming message to a queue storage and subsequently forwarding it to an available outbound handler for processing;

if the sequence status indicates that at least one of the outbound handlers is currently processing a message of said sequence; or if the queue storage already comprises a message to be processed for said sequence; or if the incoming message is determined not to be the next message to be processed for said sequence, then storing the incoming message in a memory of an overflow storage to keep for further processing.

Thus the system can be seen as a router including: inbound handlers receiving messages pertaining to many sequences; a storage layer comprising a sequence storage and a queue storage and being configured to receive the messages from the inbound handlers, to store them in a memory and to forward the messages to outbound handlers while ensuring the correct sequencing of the messages within their respective sequence; outbound handlers being configured to receive messages, to process them and to possibly deliver them to the correct recipient.

The invention therefore provides a solution for maintaining the order of messages pertaining to a same sequence while allowing parallel processing of various sequences in a distributed environment. In addition, decoupling the inbound and the outbound handlers allows isolating the throughput of the emitters from the throughput of the recipients. Furthermore, the number of inbound handlers and outbound handlers is highly scalable. Additionally, the invention avoids creating an affinity between a sequence and an in/outbound handler, allowing thereby any in/outbound handler to handle a message of any sequence. Thus, the invention offers a strong resiliency, since the outage of some handlers or outbound handlers does not affect the processing of the messages.

In another embodiment, the invention relates to a non-transitory computer-readable medium that contains software program instructions, where execution of the software program instructions by at least one data processor results in performance of operations that comprise execution of the method according to the invention.

In another embodiment, the invention relates to a distributed and parallel processing system for sequencing asynchronous messages comprising:

a plurality of inbound handlers, comprising at least one data processor, each of the plurality of inbound handlers being configured to receive independently a plurality of incoming messages pertaining to various sequences;

a plurality of outbound handlers, comprising at least one data processor, each of the plurality of outbound handlers being configured to process and forward independently the plurality of incoming messages; and a storage layer comprising at least a memory and comprising:
   a storage queue for storing incoming messages ready to be transmitted to the plurality of outbound handlers;
   a sequence storage comprising: a sequence status context (802) for maintaining and updating a status of sequences of the incoming messages; and an overflow storage configured to receive the messages from the inbound handlers and to sequentially forward them to the queue storage, the system being also configured to determine if an incoming message is the next message to be processed for maintaining the order of the messages in the sequence of this message and to perform the following steps performed with at least one data processor;

if the sequence status indicates that none of the outbound handler is currently processing a message for said sequence and if the incoming message is determined to be the next message to be processed for said sequence, then forwarding the incoming message to the queue storage and subsequently forwarding it to an available outbound handler for processing;

if the sequence status indicates that at least one of the outbound handlers is currently processing a message of said sequence; or if the queue storage already comprises a message to be processed for said sequence; or if the incoming message is determined not to be the next message to be processed for said sequence, then storing the incoming message in the overflow storage to keep for further processing.

According to an optional embodiment, the storage queue and the sequence storage of the storage layer are implemented in an in-memory data or in a file base storage. Alternatively, the storage queue and the sequence storage of the storage layer are implemented in a client-server storage database.

Preferably, checking the sequence status comprises retrieving the status of a sequence based on the sequence correlation value of said sequence.

In another embodiment, the invention relates to a computer-implemented travel monitoring method for processing asynchronous messages between at least one server application and at least one client application in a parallel environment having a plurality of inbound handlers and a plurality of outbound handlers, the method comprising the following steps performed with at least one data processor:

receiving in an inbound handler an incoming message with a sequence correlation value that identifies a sequence comprising the incoming message, checking for a sequence status of said sequence in a sequence storage;

determining if the incoming message is the next message to be processed for maintaining the order of the messages in said sequence;

if the sequence status indicates that none of the outbound handler is currently processing a message for said sequence and if the incoming message is determined to be the next message to be processed for said sequence, then forwarding the incoming message to a queue storage and subsequently forwarding it to an available outbound handler for processing;

if the sequence status indicates that at least one of the outbound handlers is currently processing a message of said sequence; or if the queue storage already comprises a message to be processed for said sequence; or if the incoming message is determined not to be the next message to be processed for said sequence, then storing the incoming message in an overflow storage to keep for further processing, wherein the messages comprise data related to passengers and the sequence correlation value contain data related to references of a transportation service.

The method according to the invention may also comprise any one of the following additional features and steps.

Once processed, the messages are forwarded from the outbound handlers to at least one of: a travel reservation and booking system, an inventory system of an airline, an electronic ticket system of an airline, a departure control system of an airport, the operational system of an airport, the operational system of an airline, the operational system of a ground handler.

In one embodiment, the references of a transportation service comprise at least one of the following: a flight number, a date and a class reservation.

In one embodiment, the messages are indicative of any one of: boarding passengers, cancelled passengers, added passengers.

In one embodiment, a sequence time out value is provided for each incoming message in order to remove the incoming message stored in the overflow storage after a sequence time out value is reached, the sequence time out value being triggered by the departure time of a flight or being any one of: an expiration of a flight offer or an expiration of a promotion.

In another embodiment, the invention relates to a non-transitory computer-readable medium that contains software program instructions, where execution of the software program instructions by at least one data processor results in performance of operations that comprise execution of the above method according to the invention.

In another embodiment yet, the invention relates to a computer-implemented method of sequencing distributed asynchronous messages in a distributed and parallel system having a plurality of inbound handlers and a plurality of outbound handlers comprising at least one processor to process the messages, the method comprising the following steps performed with at least one data processor:

receiving in an inbound handler an incoming message with a sequence correlation value that identifies a sequence comprising the incoming message and determining a message rank indicating the order of the incoming message in said sequence;

checking for a sequence status of said sequence in a sequence storage;

if the sequence status indicates that none of the outbound handler is currently processing a message for said sequence and if:

the incoming message as received is not provided with any index indicating the message rank within the sequence and the sequence storage does not already comprise any message to be processed for said sequence, or if the incoming message as received is provided with an index indicating the message rank within the sequence, said message rank being equal to a sequence rank indicated in the sequence storage and defining the rank of the next message to be processed for said sequence, then forwarding the incoming message to a queue storage and subsequently forwarding it to an available outbound handler for processing;

if the sequence status indicates that at least one of the outbound handlers is currently processing a message of said sequence; or if the queue storage already comprises a message to be processed for said sequence; or if the incoming message as received is provided with an index indicating the message rank within the sequence, said message rank being greater than a sequence rank indicated in the sequence storage and defining the rank of the next message to be processed for said sequence, then storing the incoming message in an overflow storage to keep for further processing.

BRIEF DESCRIPTION OF THE DRAWINGS

The foregoing and other aspects of the embodiments of the present invention are made more evident in the following Detailed Description, when read in conjunction with the attached Figures, wherein.

DETAILED DESCRIPTION

Figure 1:
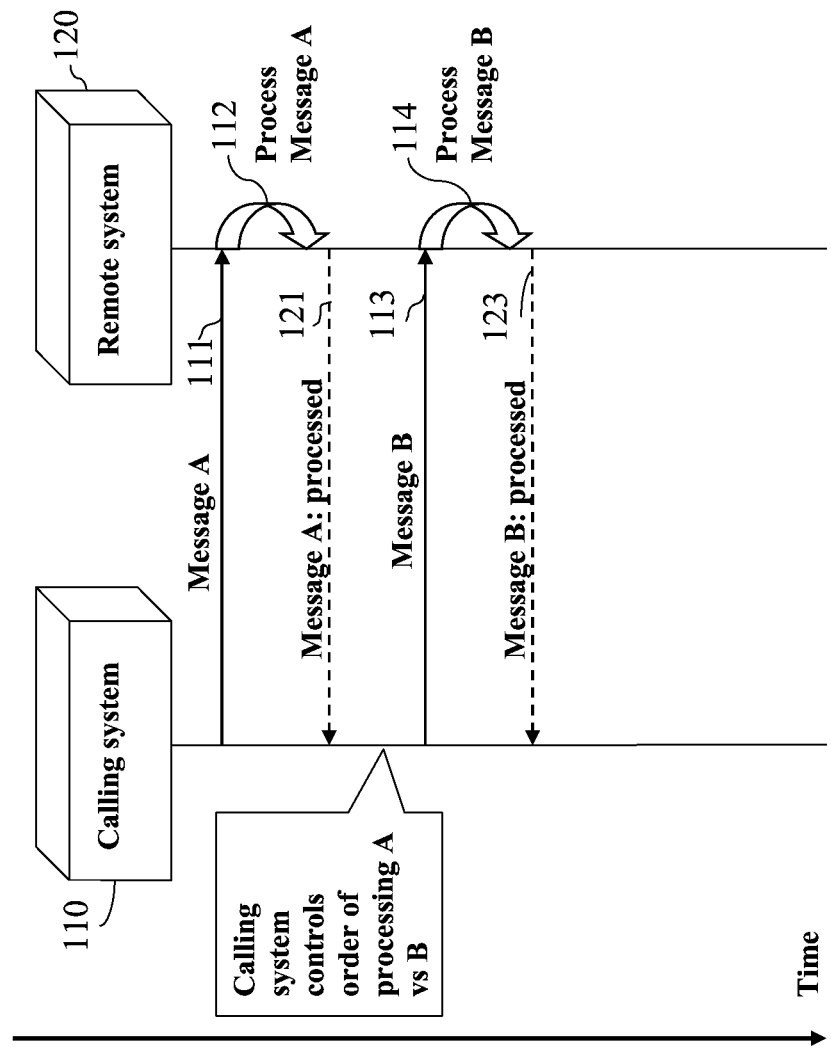
FIG. 1 is an exemplary flow diagram showing a chronological processing of synchronous calls or messages between a calling system and a remote system.
Figure 2:
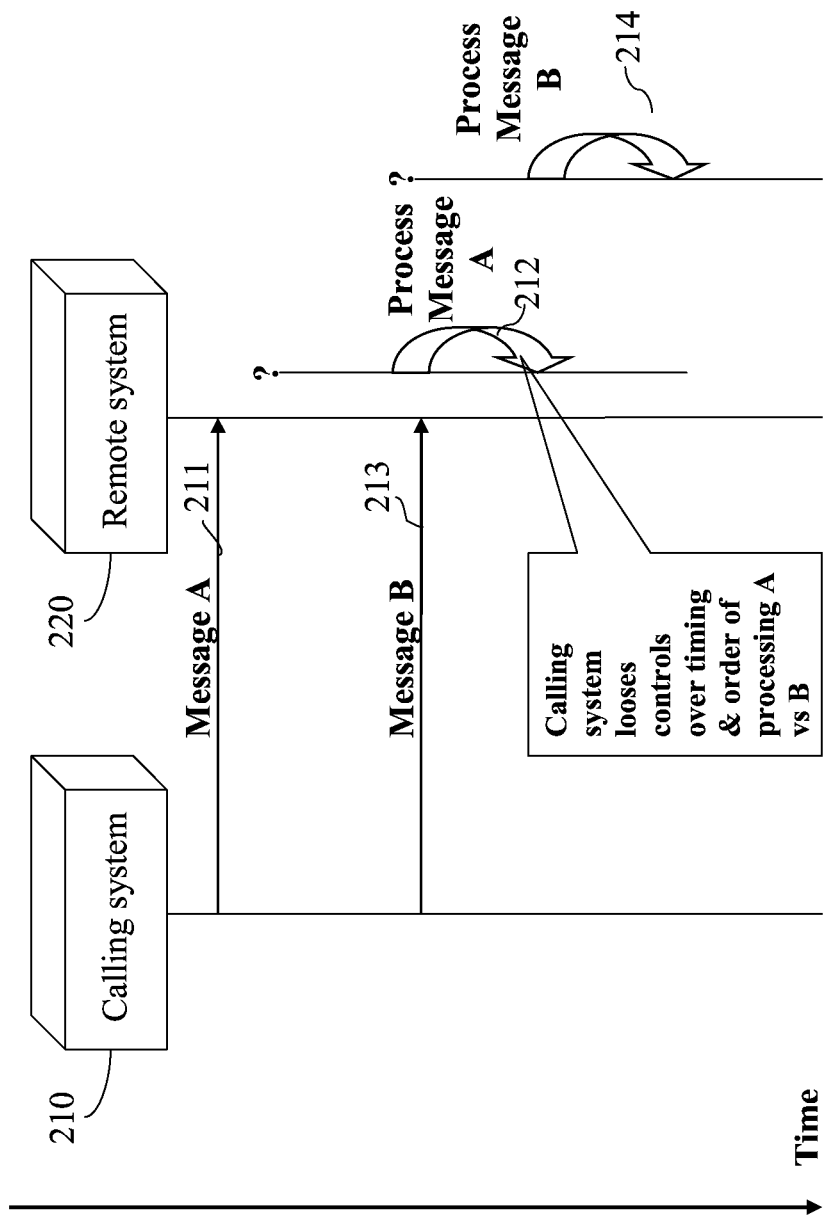
FIG. 2 is an exemplary flow diagram showing a chronological processing of asynchronous calls or messages between a calling system and a remote system.
Figure 3:
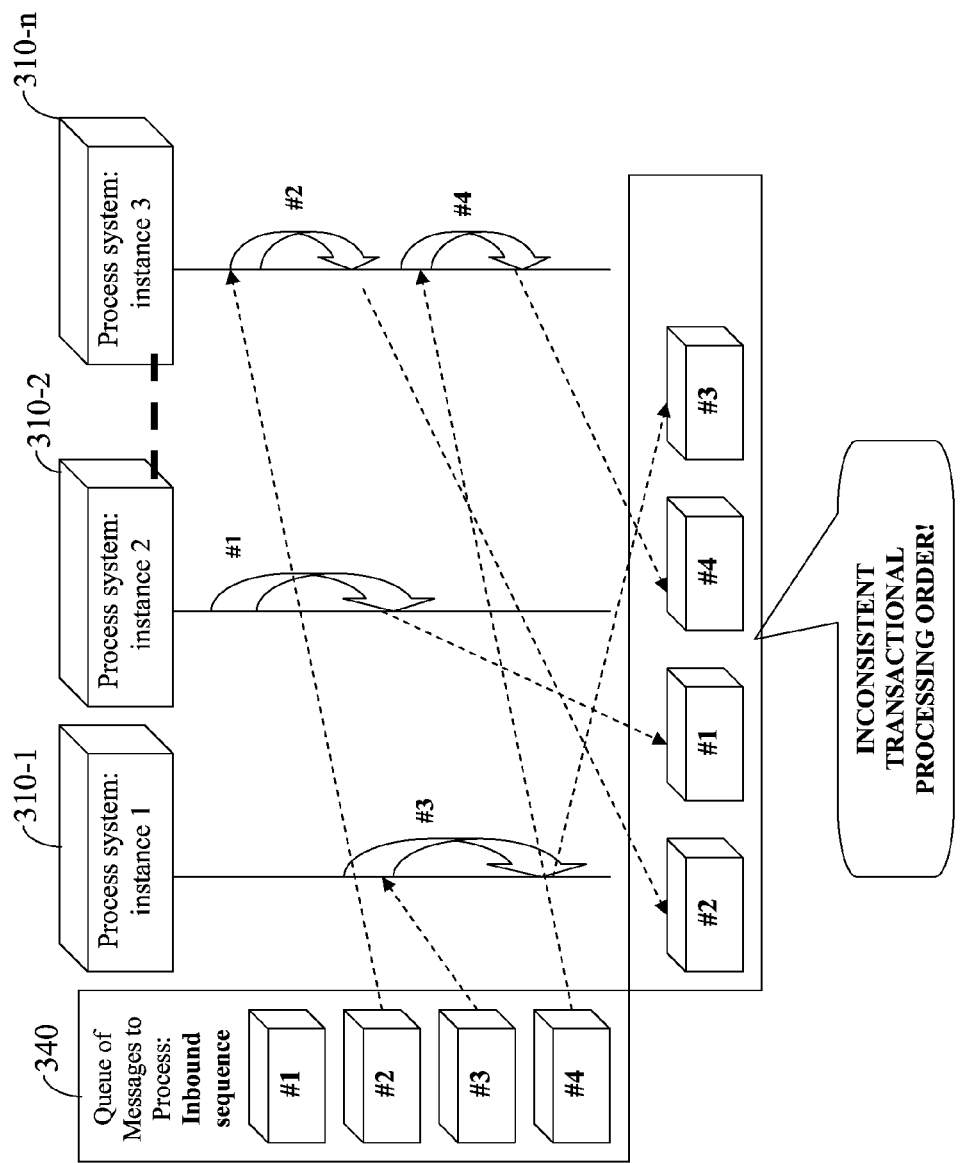
FIG. 3 is an exemplary flow diagram showing a parallel processing of calls or messages in a distributed process system.
Figure 4:
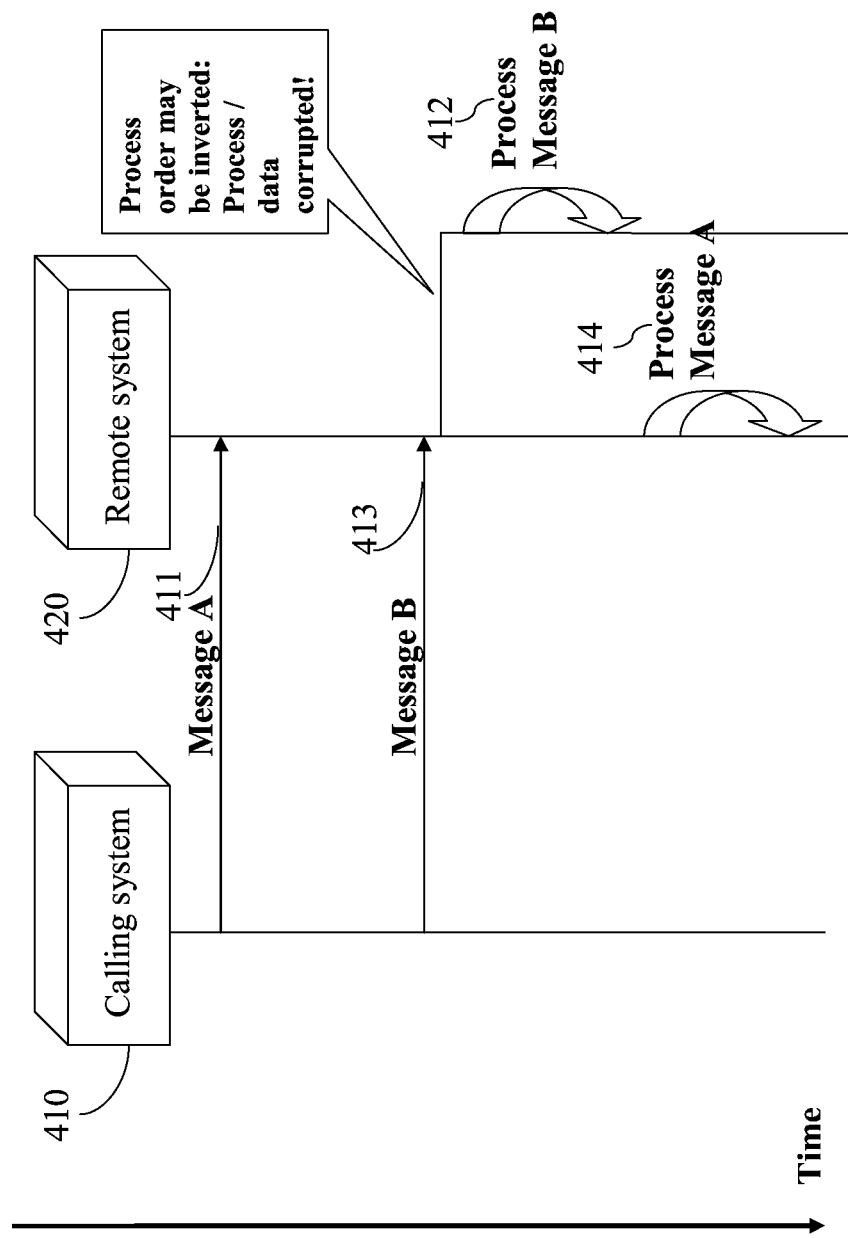
FIG. 4 is an exemplary flow diagram showing a parallel processing of asynchronous calls or messages in a distributed process system which results in a risk of de-ordering the processing of messages and corrupted data.

Before providing a detailed description of the invention some advantageous features of a non limitative embodiment are mentioned.

It is first recalled that according to one embodiment, the invention describes a computer-implemented method of sequencing distributed asynchronous messages in a distributed and parallel system having a plurality of inbound handlers and a plurality of outbound handlers, the method comprising the following steps performed with at least one data processor:

receiving in an inbound handler an incoming message with a sequence correlation value that identifies a sequence comprising the incoming message, checking for a sequence status of said sequence in a sequence storage;

determining if the incoming message is the next message to be processed for maintaining the order of the messages in said sequence;

if the sequence status indicates that none of the outbound handler is currently processing a message for said sequence and if the incoming message is determined to be the next message to be processed for said sequence, then forwarding the incoming message to a queue storage and subsequently forwarding it to an available outbound handler for processing;

if the sequence status indicates that at least one of the outbound handlers is currently processing a message of said sequence; or if the queue storage already comprises a message to be processed for said sequence; or if the incoming message is determined not to be the next message to be processed for said sequence, then storing the incoming message in a memory of an overflow storage to keep for further processing.

The method according to this embodiment may also comprise any one of the following additional features and steps:

In one embodiment, the step of determining if the incoming message is the next message to be processed for maintaining the order of messages in said sequence, comprises:
determining a message rank indicating the order of the incoming message in said sequence,
comparing the message rank to a sequence rank defining the rank of the next message to be processed for said sequence,
if the message rank is equal to the sequence rank, then the message is determined to be the next message to be processed for maintaining the order of the messages in said sequence,
if the message rank is greater than the sequence rank, then the message is determined not to be the next message to be processed for maintaining the order of the messages in said sequence.

Preferably, the sequence rank is indicated in the sequence storage.

Typically, processing a message at an outbound handler means that the outbound handler sends or delivers the message to a recipient.

Advantageously, upon completion of the processing of a message of a given sequence at an outbound handler, the sequence rank of said given sequence is incremented.

Preferably, when the sequence rank of a sequence is incremented, the method comprises checking if the overflow storage comprises a message with a message rank that is equal to the sequence rank as incremented and subsequently forwarding this message to the queue storage.

According to an advantageous embodiment, if the incoming message as received is not provided with any index indicating the message rank within the sequence, then the step of determining a message rank comprises assigning to the incoming message a message rank indicating the rank of the incoming message in its sequence and storing the assigned message rank in the sequence storage.

Preferably, the assigned message rank corresponds to the rank of the last message received at any one of the inbound handlers for said sequence plus one increment. Thus, if the incoming message is the first message for said sequence, then the message rank is 1. If the message rank of the previous message that was received at an inbound handler is N, then, the message rank assigned to the newly incoming message is N+1.

In another advantageous embodiment, the incoming message as received in the inbound handler is provided with an index indicating the message rank within the sequence.

Preferably, if the message rank is greater than the sequence rank, then the status of the sequence is set to "pending". Thus, "Pending" means that the overflow storage area contains at least a message for the given sequence, but that this or these messages have a message rank that is not equal to the sequence rank.

Typically, the sequence status is set to "waiting" when none of the outbound handler is currently processing a message for said sequence and when no message for that sequence is in the overflow storage area. Typically, the sequence status is set to "Processing" when at least one of the outbound handlers is currently processing a message of said sequence.

Advantageously, if the queue storage does not comprise any message for the sequence of the incoming message and if the message rank of the incoming message is greater than the sequence rank indicated in the sequence storage, then the incoming message is stored in the overflow storage until the sequence rank is incremented and equals the message rank of the incoming message.

Thus, if the message was provided with a message rank by the originator of the message or a third party, and if the message rank is greater than the sequence rank then the message is stored in the overflow storage. When other messages having a lower message rank will be processed, then the sequence rank will be incremented until it reaches the message rank of the message previously stored. This message can then be released from the sequence storage and can be sent to the queue storage once the queue storage and the inbound handlers are not storing and processing a message of this sequence.

The same applies for messages that are not provided with a message rank but for which a message rank is assigned by the system according to their arrival order.

Advantageously, when a message has been successfully processed by an outbound handler it is then removed from the queue storage.

Advantageously, the outbound handlers operate asynchronously, allowing thereby an outbound handler to send a message and then to be available for another processing upon sending the message and before receiving an acknowledgment of response from a recipient of the message.

According to an advantageous embodiment, an outbound handler comprises a delivery process that sends messages to recipients and an acknowledgment process that receives acknowledgment of receipt from the recipients. The delivery process and the acknowledgment operate independently, allowing thereby a delivery process to be available immediately upon sending a message.

Advantageously, upon receiving the incoming message and before the checking step, the method comprising performing an inbound locking step wherein all inbound handlers are prevented to receive another message of said sequence until the incoming message is stored in the sequence storage or is sent to the queue storage.

Advantageously, an incoming message can be accepted at an inbound handler while another message for the same sequence is being sent or processed by an outbound handler. The only limited cases for which an incoming message needs to wait for release of the locking are:
another incoming message is being stored in the storage layer or is being received in an inbound handler,
a recipient's response on a message of said sequence is being received and processed by outbound handler. When an outbound handler receives a reply, i.e., an acknowledgment, from a recipient, it locks the sequence and the corresponding rank, time to seek next message to be sent in said sequence if any and to increment the rank.

Preferably, the inbound locking step comprises locking a mutex dedicated to said sequence, said mutex being stored in the sequence storage.

Preferably, before receiving an incoming message, the inbound handler checks the sequence correlation value of the sequence of said incoming message and reads the mutex parameter for said sequence. The inbound handler accepts the incoming message if the mutex is not locked. If the mutex is locked, the incoming message waits for the release of the mutex.

More precisely, the mutex is stored in a sequence register comprised in the sequence storage.

Advantageously, there is only one mutex per sequence and for the inbound and the outbound handlers. The storage queue ensures that for a given sequence only one message is propagated to an outbound handler until the outbound handler layer has completed the processing of the message for that sequence.

Preferably, the outbound locking step comprises locking a mutex dedicated to said sequence, said mutex being stored in the sequence storage.

Advantageously, when an outbound handler is available, it checks in the queue storage if a message is available for processing, then it retrieves said message and processes it.

Preferably, when an outbound handler is available, it checks in the queue storage 850 if there is an available message to process. If there is a message, then this message is automatically the correct message to be processed for said given sequence.

In one embodiment, upon storage of the incoming message in the sequence storage, the inbound handler sends an acknowledgment message.

Typically, the acknowledgment message is sent to an originator of the message.

Advantageously, a message having a message rank greater than the sequence rank is stored in the overflow storage to lock the message sequence in the overflow storage, as long as its message rank is not matching the sequence rank, i.e., the rank of the next message to be processed.

Preferably, a message having a message rank greater than the sequence rank is first stored in the overflow storage and is then discarded from the overflow storage after a time out value assigned to the sequence of the message is reached. Alternatively or in addition, a message having a message rank greater than the sequence rank is first stored in the overflow storage and is then discarded from the overflow storage after a time out value assigned to the message is reached.

Although the following description is given in the context of an application to the travel industry, it does not represent a limiting example since the present invention is applicable to all sorts of data processing as well as travel products such as hotel rooms, car rental, railways tickets or the like.

According to the present invention, the processing order of a message is defined in an asynchronous and parallel environment by the emitter of the message or the calling system, either explicitly by providing an index indicating the rank of each message within the sequence, or implicitly by delivering messages sequentially and awaiting a transport acknowledgement of a given message before sending the next message in the given sequence.

The present invention aims to ensure that concurrent and independent processes respect the sequencing order for processing a given set of messages defined as a sequence.

In that respect, the method, apparatus and system for sequencing distributed asynchronous messages according to the present invention perform various actions that are be briefly explained below and that will be afterwards detailed with further details in reference to the drawings.

Each message or service call belonging to a given sequence is tagged, by interface definition, to actually refer to the specific sequence it belongs to.

The rank of a message or service call within a sequence of messages is either:
Explicitly provided by the emitter/sender of the messages or service calls, through adequate interface. For instance the message comprises a field including an index that defines the rank of the message within its sequence or
Implicitly by using the sequential order in which the messages or service call in the sequence are received overtime.

Once the sequence and the message rank or the service call order are identified, the sequence has to be managed properly.

Figure 5:
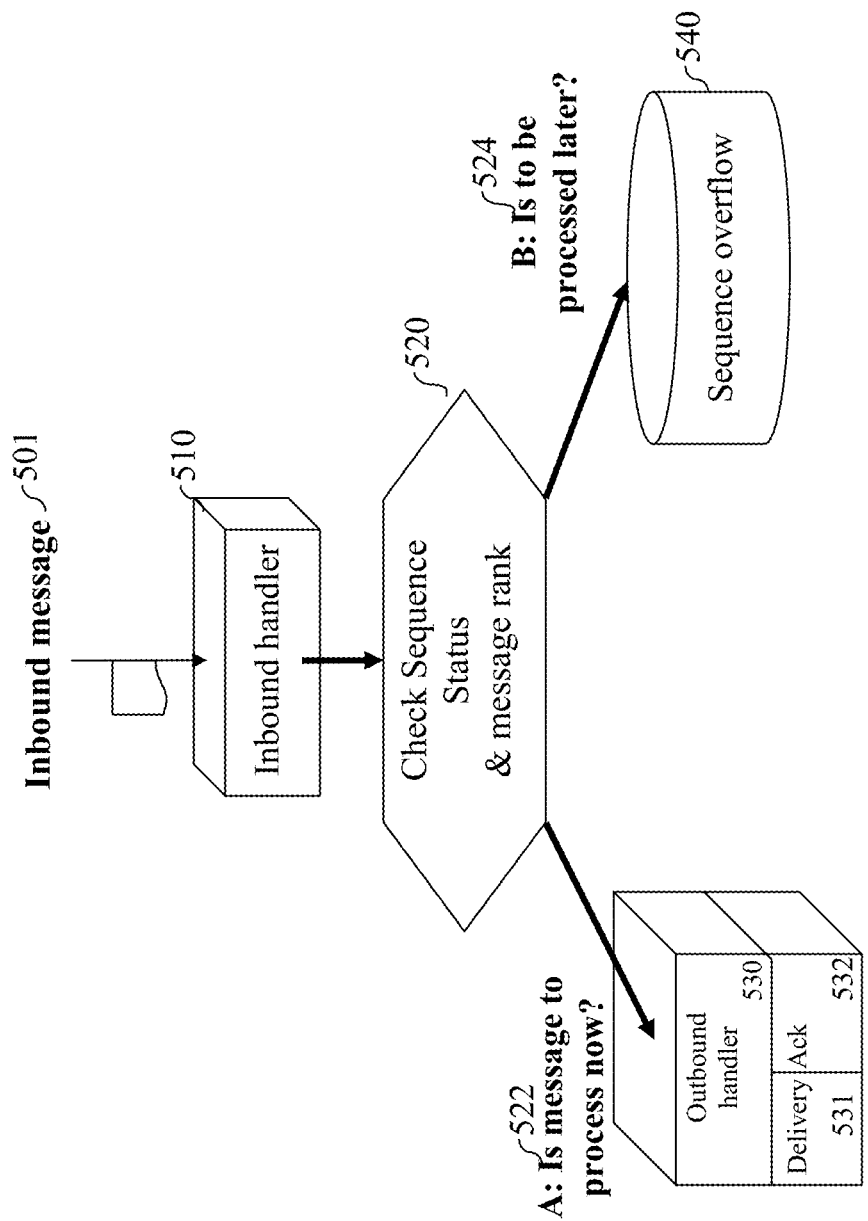
FIG. 5 shows an exemplary block diagram of a high level sequence management in a centralized and shared sequence context according to the present invention.

FIG. 5 shows an exemplary block diagram of a high level sequence management in a centralized and shared sequence context. In this figure, the main features of the system and the main steps are shown in detail.

The asynchronous and distributed processing system comprises an Inbound handler 510 receiving incoming messages 501, an outbound handlers 530 configured to process messages and deliver them. The system also comprises an overflow storage area 540 that possibly stores the messages received from the inbound handlers if the processing of the message 501 must be withhold to maintain the order of the sequence to which the message belongs.

The inbound handler can also be referred as an acceptor or an acceptor process. Thus the inbound handler layer can also be referred as an acceptor layer.

The outbound handler can also be referred as a processor or a delivery process. Thus the inbound handler layer can also be referred as a delivery layer.

Inbound handler 510 are in particular configured to perform any one of: receive messages from emitter such as publishers; validate integrity of messages; perform the sequence locking and status validation; store the message in one of the two areas, (i.e., storage queue or overflow area); reply to the emitter.

According to an advantageous embodiment, the outbound handlers 530 are composed of two processes. A first process, referred to as the delivery process 531 and which is configured to perform any one of: get a message from storage queue; send it to the recipient via the communication channel; quit to be available for other processes.

A second process, referred to as the acknowledgement process 532 and which is configured to: receive from the recipient an acknowledgement of reception; perform the sequence management as to put next message in corresponding sequence, if any, in storage queue; quits to be available for other processes.

Thus, the delivery layer formed of outbound handlers 532 is asynchronous which allows complying with high scalability requirement. This way, the system is independent of the latency of the recipient. More precisely, it means that an outbound handler can retrieve and deliver a message of a first sequence and can then retrieve and deliver another message of a second sequence before it receives an acknowledgement for the delivery of the message for the first sequence. Therefore, an outbound handler can asynchronously handle messages from many sequences, increasing thereby the number of messages that the system can route while always maintaining the correct order for each sequence.

According to the present invention, a central and shared sequence context is implemented, wherein a state machine is used for each sequence. Whenever an incoming message 501 is received in an inbound handler 510, a corresponding sequence context status is checked 520. According to an embodiment, if the corresponding sequence context does not exist, it is created dynamically and transparently. Thus, the invention does not require sequences to be defined in advance in the system, but is fully dynamical in this respect. In addition if the message has not been provided with an index indicating its rank within the sequence, then a message rank is assigned to the message according to the arrival order of the message.

If the sequence status indicates that the outbound handler layer is waiting for the next message of the sequence, i.e., the sequence status is "Waiting": then the incoming message 501 is processed 522 normally according to the standard behavior by an outbound handler 530 (the message will be available for the asynchronous processing); or
If the sequence status indicates that a message of the sequence is already currently being processed, i.e., the sequence status is "Processing": then the incoming message 501 is stored in a specific sequence overflow storage area 540 in order to be processed later 524. The overflow storage area 540 is structured/indexed in such a way that the order of the incoming message is not lost. In this way, the incoming message 501 is kept for further processing and it is not be available for immediate processing (as out of sequence).

The outbound handler layer receives the messages to be processed according to the standard behavior, wherein the messages are de facto, in the correct sequence rank.

Once a message 501 is processed, the outbound handler layer looks for the next message to process in the sequence in the overflow storage area 540. If such a message is found, it is pushed to the outbound handler layer, according to the standard process. If no message is found, then the sequence status is set back to "Waiting".

The order of each message within the sequence is maintained. The sequence storage defines a sequence rank indicating the rank of the next message that must be processed to preserve the order of the message of a sequence. The sequence rank is incrementally updated each time the processing of a message is complete. The sequence rank can therefore be seen as a counter.

Any incoming message which does not match the sequence rank, i.e. the rank of next message to process, is stored in the overflow storage area 540, until the correct message to process is received by the inbound handler 510. This means that the inserting/removing operations in the overflow storage area 540 are performed taking into account the rank of the sequence and the rank of each message.

As messages are stored in the overflow storage area 540 pending their turn to be processed in the sequence, it may happen that the sequence is never unlocked by the next message in sequence. While this situation does not happen very often, the present invention provides a dynamic way to leave an indicator in the context of the sequence, to take action on a sequence when it is considered expired, such as to discard the expired message or expired sequence.

Some Message Oriented Middleware, referred as MOMs, provide a sequencing feature by avoiding the use of parallelism (i.e. they enforce only one de-queuing consumer). Therefore, they provide sequence guarantee at the expense of scalability. Oracle® Advanced Queuing is a typical example.

Some other MOMs (for instance MQ-Series) do provide a sequencing feature based on a correlator, but they require the sequence messages to be processed as if they were logically grouped together. Besides, the group size has to be limited and the MOM may require additional constraints on the de-queuing process.

The distributed and parallel processing according to the present invention provides strict sequencing while keeping parallelism and scalability, and without requiring particular constraints in the way messages or services call are correlated, or processed by the de-queuing process. The high scalability and resilience of the method, apparatus and system of the present invention enables:

To implement a fully asynchronized delivery process using the "post and quit" principles in which the message is posted and the process does not wait for an acknowledgement, another process (the acknowledgment process) being in charge of receiving the acknowledgement, which allow coping with a very high message throughput; and To implement a fully distributed process and to remove any affinity between the sequences and the in/outbound handlers, allowing thereby any in/outbound handler to handle a message of any sequence.

The trivial approach to cope with message sequencing may be to revert to a mono process architecture which raises huge and sometimes unacceptable constraints in terms of resilience and scalability. On the contrary, the present invention allows the full benefit of distributed and parallel processing at two levels, the inbound handlers level and the outbound handlers level while ensuring sequencing provided the cardinality of the sequences is high. That means that the invention takes full advantage of parallelizing sequence processing only if the system has to cope with a high number of sequences in parallel.

There is no pre-requisite on the storage area and the de-queuing process in regards to the sequence maintenance:

The queuing process of message acceptance in the inbound handler layer and the queuing process of message processing in the outbound handler layer do not need to support the sequence preservation as this will be possible according to the invention;

The parallel storage and parallel retrieval of messages (i.e. queuing/de-queuing) is fully preserved;

According to a non limitative embodiment, the storage queue itself can be local to the node whereas the overflow storage area remains global, i.e., shared by all the outbound handlers. The overflow storage needs to be shared because any of the nodes can process a given sequence, therefore, they should have access to the unique overflow area to actually queue and de-queue in this storage. In case a storage queue is not shared by all outbound handlers, it can either be dedicated to a single outbound handler or to a plurality of outbound handlers. In these cases where the queue storage is not shared by all outbound handles, each message is received by only one local queue storage.

The storage of rejected messages is easier as there is no need for an exception queue since the message can sit in the overflow area with an altered status.

According to the method, apparatus and system of the present invention, the message sequence is processed in a distributed and parallel mode by performing the identification of the sequence and the identification of the message rank in the sequence. In addition to the identification, the sequence is to be managed and re-arranged including the sequence locks and the times outs. These aspects are detailed below with more details.

Identify the Sequence

Figure 6:
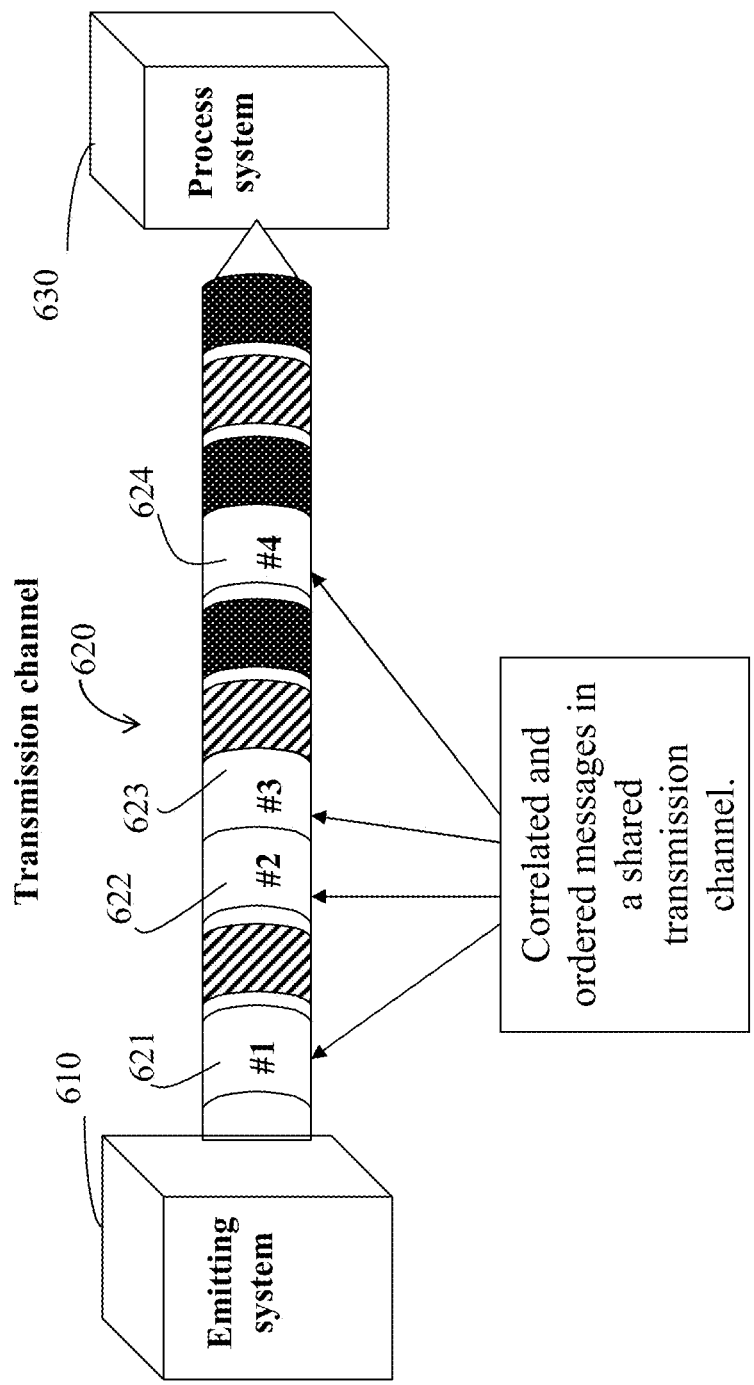
FIG. 6 is an exemplary flow diagram of the process for identifying sequences within a transmission and processing channel according to the present invention.

In a flow of messages or events sharing a given transmission channel, each set of correlated messages, in sense of sequence to respect, requires to be explicitly defined FIG. 6. This figure shows an exemplary flow diagram of the process for identifying sequences within a transmission and processing channel 620 between an emitting system 610 and a process system 630.

A dedicated parameter is provided to each messaging primitive involved in a given transmission. This dedicated parameter is a sequence identifier also referred a sequence correlation value. It is typically an alphanumeric value set by the emitting system of the message. This parameter is used by each involved component to actually identify messages belonging to the same sequence. For instance, messages 1 to 4 are parsed in the transmission channel 620 and identified as messages #1, . . . , #4. Although these correlated and ordered messages are sharing the same transmission channel 620, they are not consecutively following each other. They are intertwined in the transmission channel 620 with messages belonging to another sequence.

The sequence correlation parameter is defined in a way to ensure it is not shared by distinct colliding processes on a given transmission and processing chain. In this context, it is mandatory to have a strict uniqueness. Preferably, this definition of the sequence correlation parameter is the responsibility of the business process using the system.

Identify the Message Rank in the Sequence

Messages which require to be processed in a specific order can be categorized in two kinds:
- The first kind of messages for which the order or rank within the sequence is known at the time of the message creation, and preferably for which the total number of messages is also known at the time of the message creation; wherein the generating process is capable of assigning to each message a specific sequence rank number in the transmission primitive. This sequence rank number is then conveyed and stored by each process as part of an overall chain until the final processing is performed; and
- The second kind of messages for which the ordering within the sequence is determined at the time of generation. The processing of these second kind of messages is generally incremental, meaning that each new message (or event) in the process alters the results of the process of the previous message in the sequence. In that respect, the emitting system of a message knows neither the sequence rank number of a message in a given sequence, nor the total number of messages within a sequence.

For conciseness reasons, in the present description the sequence rank number of a message in a given sequence is referred to as the message rank.

Core Sequence Management

Figure 7:
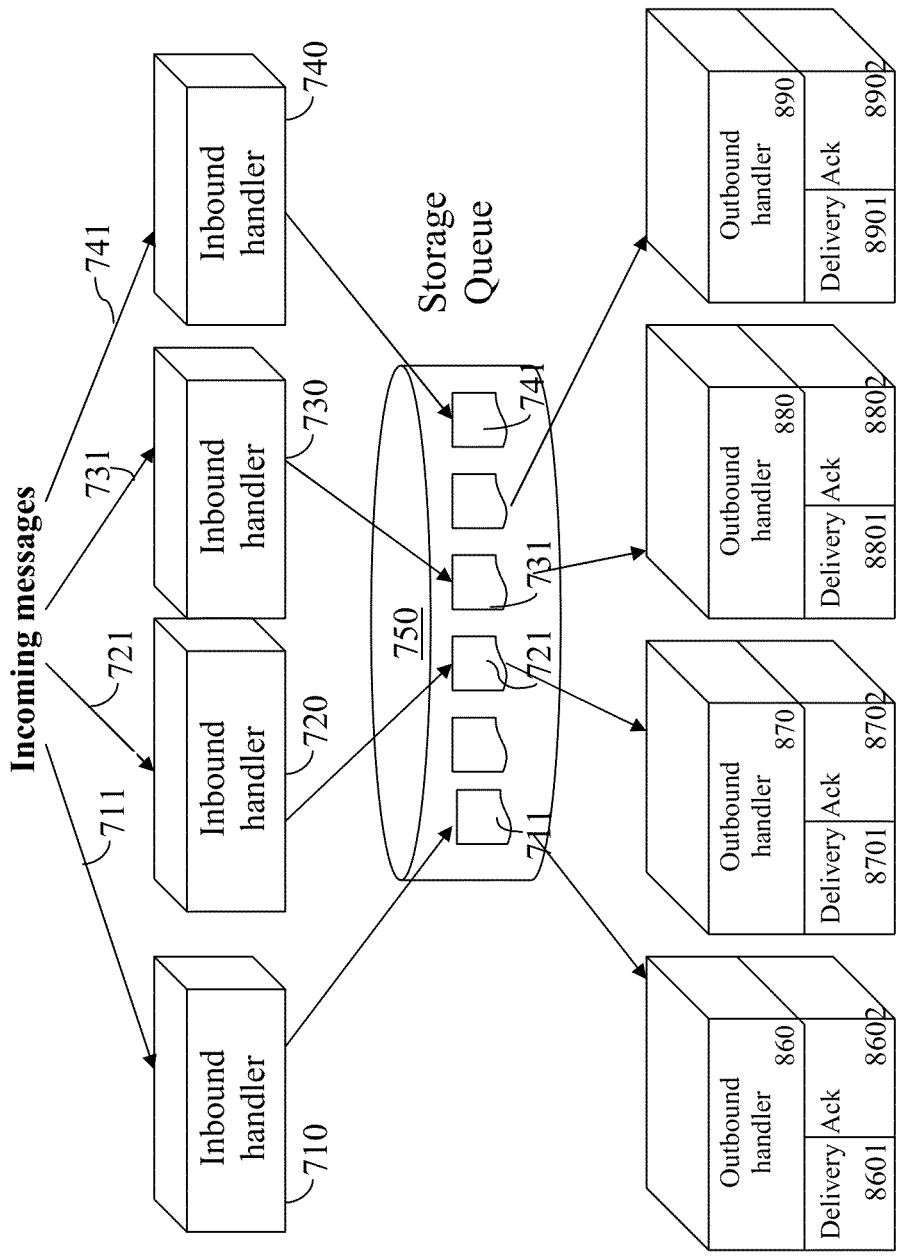
FIG. 7 shows an exemplary of asynchronous and distributed processing system according the present invention.

As illustrated in FIG. 7, an exemplary of asynchronous and distributed processing system comprises:
- A plurality of Inbound handlers 710, 720, . . . , 740 forming an inbound handlers layer. The inbound handlers receive incoming messages 711, 721, 731 and 741, store them respectively in a storage queue 750 and possibly acknowledge good reception of these incoming messages 711, 721, 731 and 741 to the emitting system;
- A plurality of Outbound handlers 760, 770, . . . , 790 forming an outbound handlers layer. Each outbound handler is configured to retrieve messages from the storage queue 750 and to process them. Outbound handlers are also in charge of forwarding the processed messages to applications.

The inbound handlers can also be referred as acceptors or an acceptor processes. The outbound handlers can also be referred as a processors or a delivery processes.

Figure 8A:
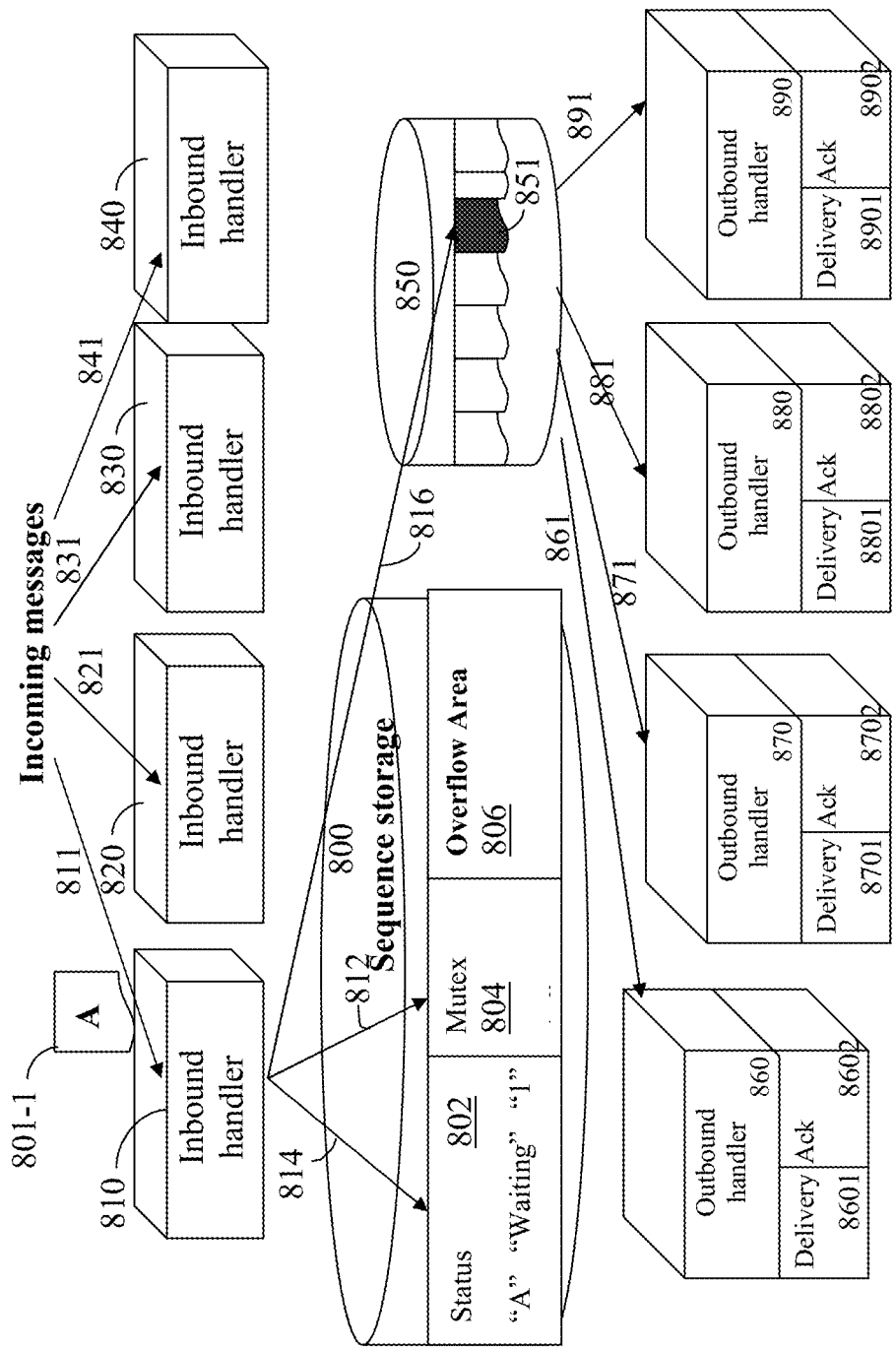
FIG. 8A is an exemplary step of a sequencing process wherein an inbound handler receives a first message on sequence A according to the present invention.

FIG. 8A shows an improvement of the embodiment of FIG. 7 illustrating exemplary steps of a sequencing process of a first message of sequence A received by an inbound handler from the emitting system. In this improvement, an additional component, referred as sequence storage 800, is implemented as part of the storage layer between a plurality of inbound handlers 810, 820, . . . , 840 and a plurality of outbound handlers 860, 870, . . . , 890. The sequence storage 800 comprises:
- A centralized or common and shared sequence Mutex 804, also referred as Mutex to ensure that only one handler is handling a message for a given sequence (or with the same sequence correlation value) at a time; any competing attempt will be served on the first come first served model.
- A centralized or common and shared sequence Status context 802, also referred as Status, to maintain a shared sequence status between all processes; a sequence being uniquely identified by its sequence correlation value. The Status also enables to determine for each event on a given sequence the behavior to apply:
  - "waiting" status meaning that the next incoming message can be queued for delivery;
  - "delivering" status, meaning that the next incoming message is retained.
- A centralized or common and shared Overflow storage 806, also referred as Overflow or Overflow storage area to ensure that only the next message to be processed by the plurality of outbound handlers is accessible to them, other being "pending" in this Overflow storage. The Overflow storage is a storage for indexed and ordered sequenced messages that are not ready to be delivered in regards to the current sequence status.

These three components Status 802, Mutex 804 and Overflow storage 806, which are contextual processing information, are of the same nature as the storage queue 850. They can be implemented:
- In a memory data or file based storage, if all distributed processes run on the same node, or
- In client-server storage database(s), if the distributed processes run on several nodes wherein the server system is a remote system.

The maximum consistency between the storage layer and standard message storage can be obtained by implementing both in a common RDBMS engine sharing a unique transaction.

According to method, apparatus and system of the present invention:
- The storage queue 850 allows the message exchange between the plurality of inbound handlers and the plurality of outbound handlers, and operates independently from the sequence storage 800; and
- The overflow storage 806 of the sequence storage 800 ensures the sequencing of the message exchange between the plurality of inbound handlers 810, 820, . . . , 840 and a plurality of outbound handlers 860, 870, . . . , 890.

FIG. 8A illustrates the sequencing process of an incoming message of the present invention:
- A message 801-1 belonging to a sequence correlation value "A" is received by an inbound handler 810;
- The inbound handler 810 locks 812 the mutex 804 of sequence "A" preventing any inbound handler or outbound handler to handle another message with the sequence correlation value "A";
- The inbound handler 810 checks 814 the central status context 802 of sequence "A": wherein either the sequence does not exist or the sequence is in "Waiting" status;
- The inbound handler 810 sets 814 the status context 802 of sequence "A" to "Processing". The invention assigns to the incoming message a message rank that is equal to the rank of the previously received message plus one increment. Since the incoming message is the first one for this sequence, the message rank assigned to the message is set to 1. The message rank is preferably stored in the sequence storage 800 and more precisely in the sequence context 802. The inbound handler 810 preferably stores 816 the message 851 in the storage queue 850; and
- The inbound handler 810 acknowledges to the message emitter, releases the mutex 804 of sequence "A" and is ready to receive any other incoming message.

Figure 8B:
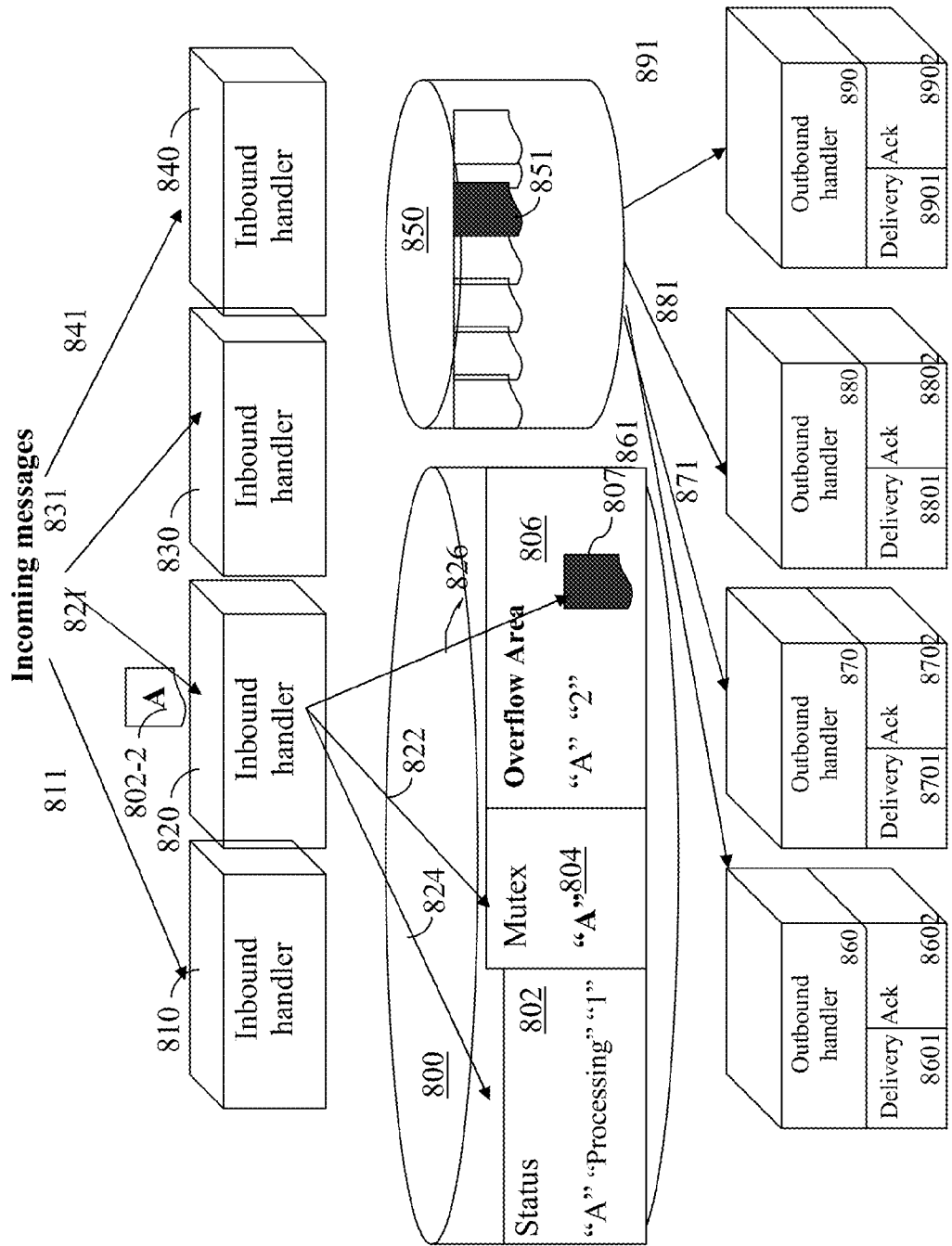
FIG. 8B is another exemplary step of a sequencing process wherein an inbound handler receives a second message on sequence A according to the present invention.

FIG. 8B illustrates the next steps of the sequencing process where another incoming message is received at the system:
- A second message, 801-2 belonging to the sequence "A" is received by an inbound handler 820;

The inbound handler 820 locks 822 the mutex 804 of sequence "A" preventing any inbound handler 810, 830 or 840 or outbound handler to handle another message within sequence "A"

The inbound handler 820 checks 824 the central status context 802 of sequence "A" where the sequence status is "Processing". Since the message cannot be made available to any outbound handlers, the inbound handler 820 stores 826 the message 807 in the overflow storage 806.

A message rank corresponding to the message rank of the previously incoming message plus one increment is assigned to the incoming message. As the message rank of the previous message was 1, thus, the message rank assigned to the incoming message is 2. In addition, the invention increments a sequence rank that defines the rank of the next message to be processed for that sequence. Thus in case a plurality of messages from the same sequence are stored in the sequence store (800), their message ranks allow the system to identify the correct message that must be forwarded to the queue storage (850). The correct message is the one having a message rank corresponding to the sequence rank as defined in the sequence. Advantageously, this applies when the incoming message has a message rank that was assigned by the emitter and when the rank of the incoming message is assigned according to its order of arrival at the inbound handlers.

Figure 8C:
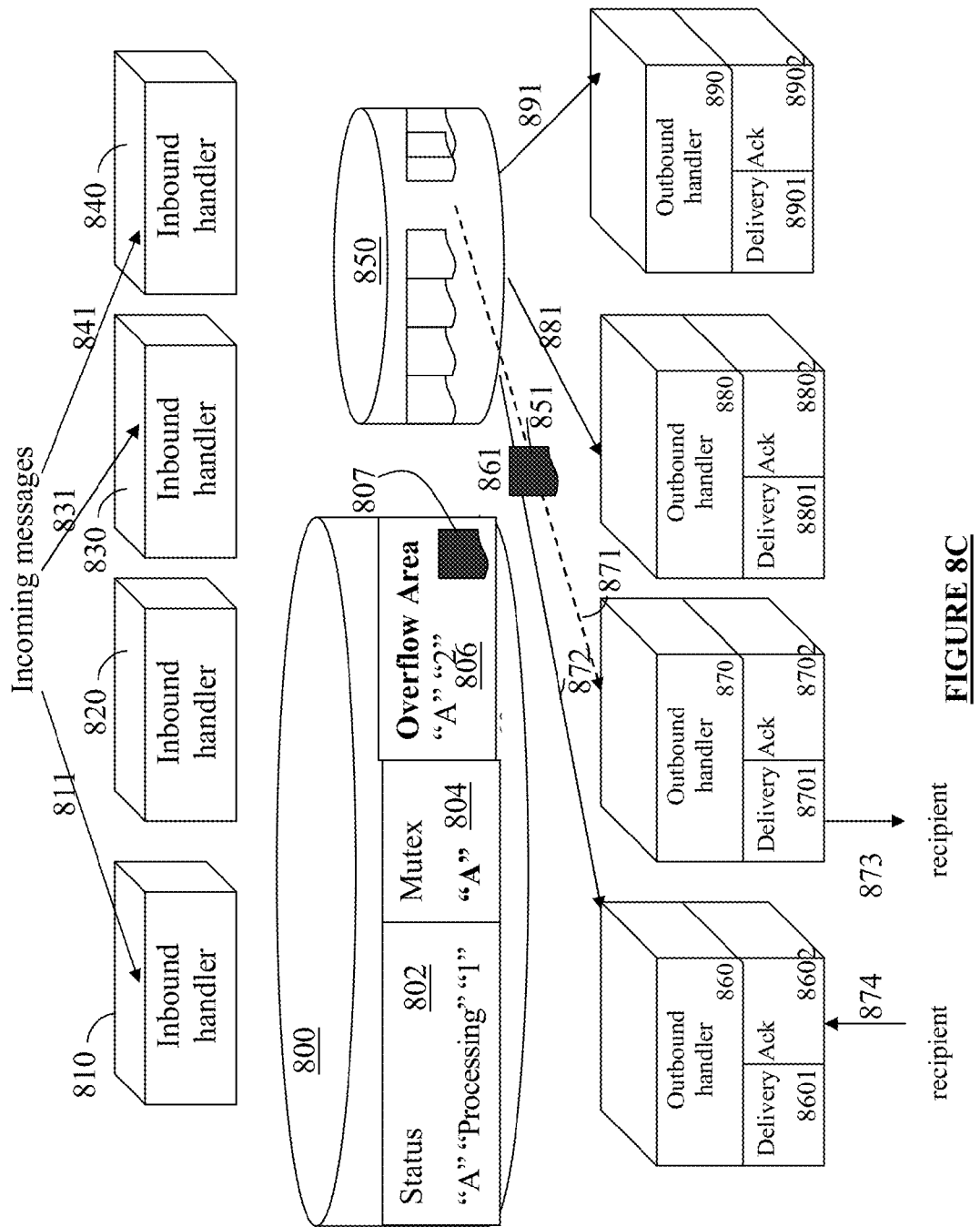
FIG. 8C is another exemplary step of a sequencing process wherein an outbound handler processes a first message on sequence A according to the present invention.

The inbound handler 820 acknowledges to the message emitter, releases the mutex of sequence "A" and is ready to receive any other incoming message;

FIG. 8C illustrates the next steps of the sequencing process where the message stored in the storage queue is dequeued to one of the outbound handlers for processing:

One of the outbound handler 870 retrieves 871 the message 851 of sequence "A" from the queue storage 850. Thanks to the invention, this message is automatically the next message of the sequence that must be processed. Therefore its rank is the rank of the last message that has been processed plus one increment. In this exemplary embodiment, since the message stored in the storage queue is the first one of the sequence A, then its rank is necessarily "1";

The outbound handler 870 delivers 873 the message with rank "1" to a relevant recipient or to another routing means before a further delivery to the recipient. Once the message has been sent at step 873, the outbound handler 870 is available for another processing. It can still operate while it has not yet received the acknowledgment of receipt from the recipient. For instance, the outbound handler 870 can retrieve and send another message that pertains to another sequence, achieving thereby an asynchronous delivery for enhancing the throughput. It can also receive an acknowledgment of receipt from any emitter and for any message. Therefore, the number of messages and processings that the outbound handler can execute is not limited by the response time of the emitter of the message that was sent at step 873.

The recipient receives the message sent at step 873 from the delivery process 8701 of the outbound handler 870. In response, the recipient sends an acknowledgment message to the system. The acknowledgment process 8702 of the same outbound handler 870 or the acknowledgment process 8602 of another outbound handler 860 receives the acknowledgment message. This corresponds to step 874 depicted in FIG. 8C.

Figure 8D:
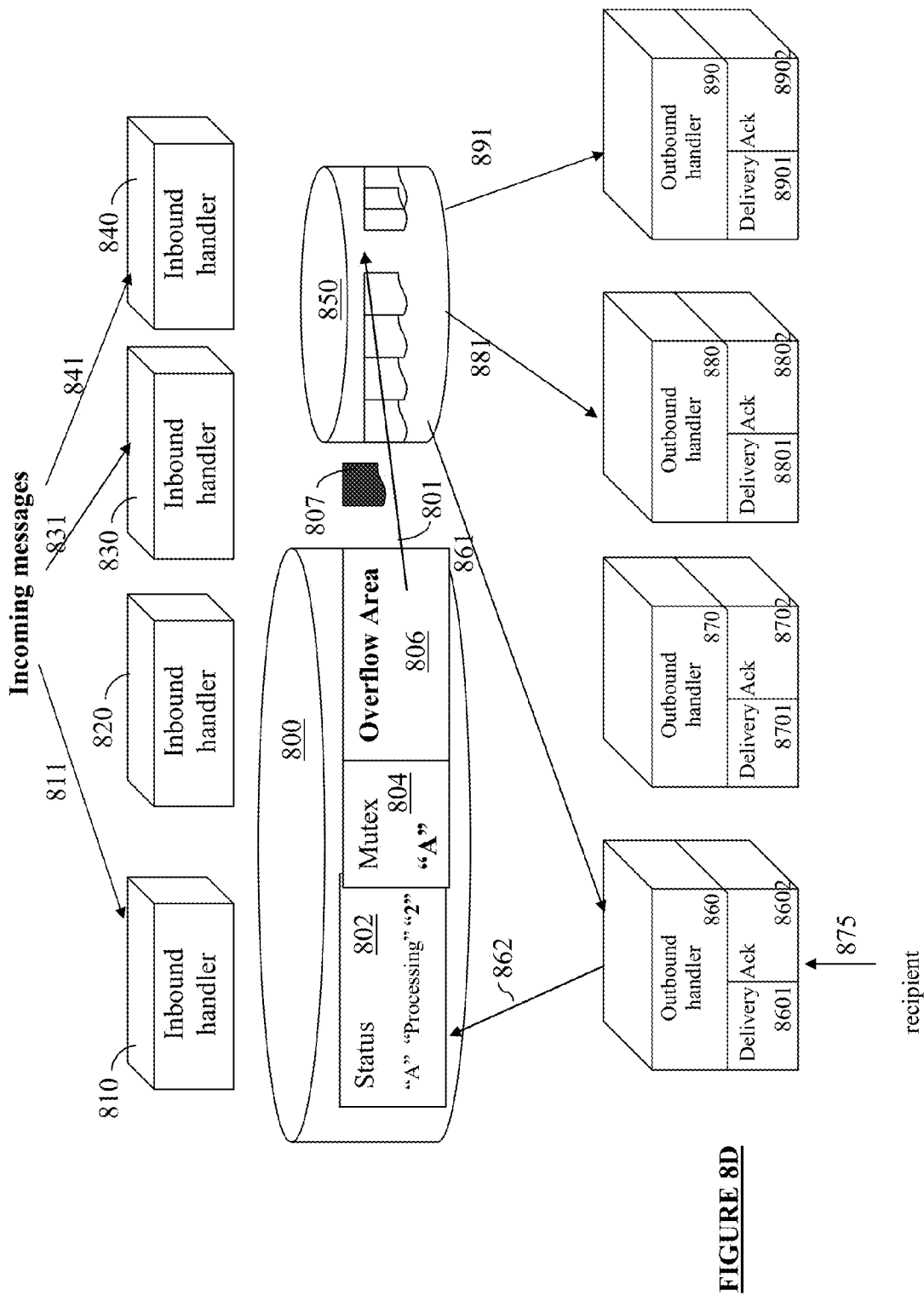
FIG. 8D is another exemplary step of a sequencing process wherein an outbound handler has processed a first message on sequence A according to the present invention.

FIG. 8D illustrates the next steps of the sequencing process where the next message stored in the overflow storage area 806 is forwarded to the storage queue 850 before being forwarded to one of the outbound handlers for processing. The steps depicted on FIG. 8D are triggered by the reception 875 of the acknowledgment message at an inbound handler of the system.

The outbound handler 860 checks 862 in the status context 802 the sequence rank to determine the rank of the next message that must be processed, within the sequence of the message being acknowledged. Since the sequence rank is set to "2", the outbound handler 860 retrieves 809 the message 807 of sequence "A" having a message rank "2" from the Overflow storage area 806. This message 807 will then be stored in storage queue 850, and will be made available to all outbound handlers. The status context 802 remains "processing". The sequence rank is incremented and is set to "3", thereby indicating that the next message to be processed is the one having a message rank equal to "3";

The outbound handler 860 exits and is ready to process another message stored in the storage queue 850.

And the process goes on until the full sequence of the incoming messages is processed and delivered.

The process described above in FIGS. 8A-8D is identical whether the incoming messages are received with or without a sequence index indicating the rank of the message within the sequence. In the case it is provided, it is used as sequencing ranking otherwise; the ranking is generated by the inbound handler based on the order of reception within the same sequence.

Re-Arranging the Sequence

In addition to the process detailed previously in FIGS. 8A-8D, in which the incoming messages are received by inbound handlers in a strict sequence rank, the same process is also implemented in order to cope with messages received out of sequence. The only de facto pre-requisite is that message emitters provide with an index for each message within the same sequence, the index indicating for each message its rank within the sequence.

As indicated previously, the invention increments a sequence rank that defines the rank of the next message to be processed for that sequence. When the storage queue 850 can receive a message from a given sequence, then the sequence rank is checked. Only the message with a message rank equal to the sequence rank is forwarded to the queue storage 850. If there is no message in the sequence storage 800 having a message rank that is equal to the sequence rank, then the processing of this sequence is withhold until a message with the correct rank is received from an inbound handler. Thus, the sequence rank operates like a counter that indicates the message that must be processed. Preferably, the sequence rank is stored in the sequence storage 800.

Figure 8E:
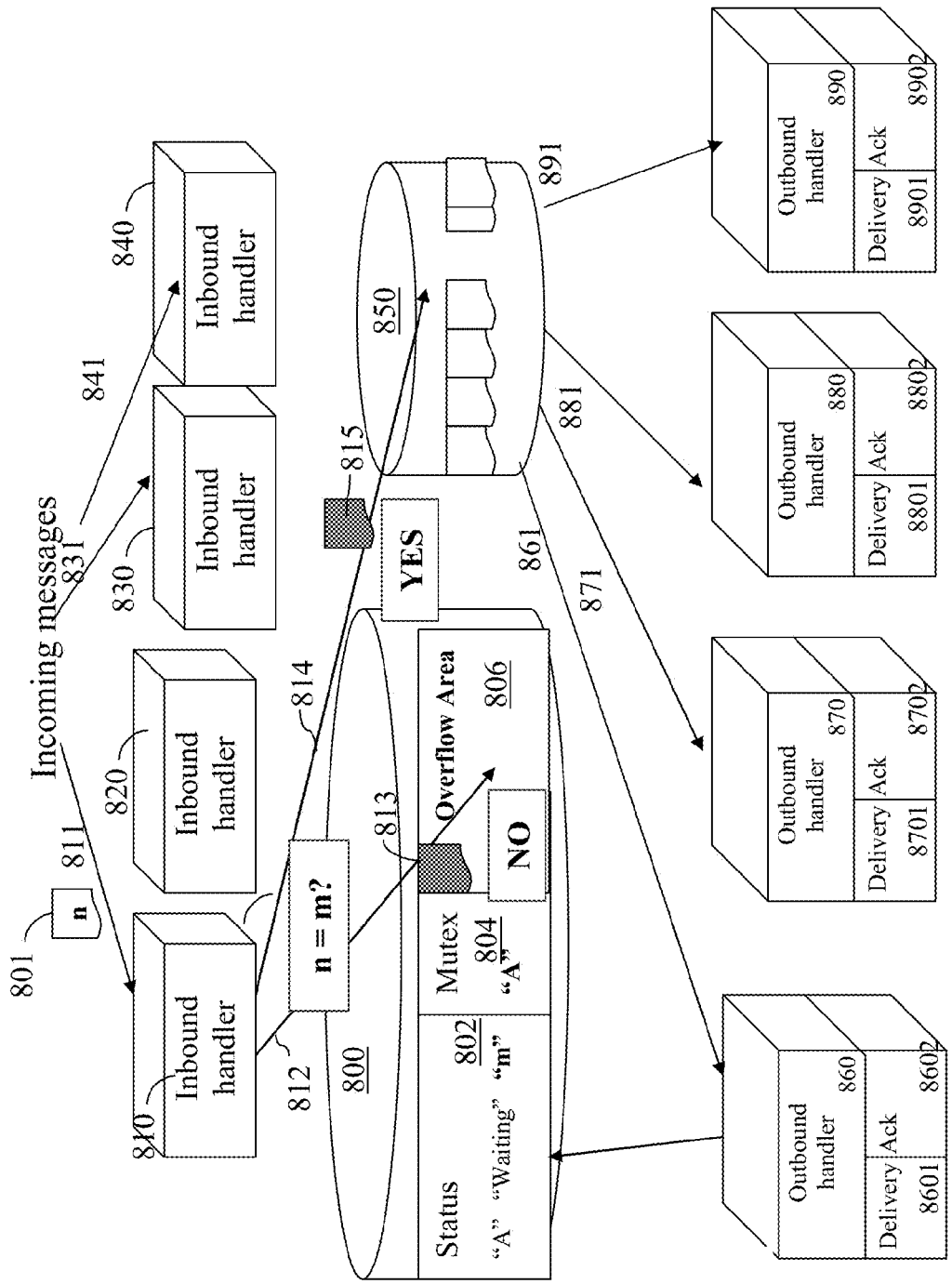
FIG. 8E is an exemplary step of a sequencing process wherein a sequence is re-arranged according to the present invention.

FIG. 8E illustrates the steps of the sequencing process of an incoming message 801 with the re-arrangement of the sequence:

In addition to the previously described process performed by the plurality of inbound handlers 810, . . . , 840, additional steps may occur for the re-arrangement driven by an index order:

The rank of the message as indicated by the index of the message is compared to the rank of the next message to process in order to maintain the sequence rank. This rank of the next message to process in order to maintain the sequence rank is indicated by the sequence rank that is incrementally updated, preferably in the sequence storage.

If the rank of the message matches 818 the sequence rank, then the incoming message 815 is stored in the storage queue 850, to be available to the plurality outbound handlers. The sequence status is set to processing. The sequence rank to process is incremented and the previously described process applies.

If the rank of the message as indicated by the index is over the sequence rank 819, then the message 813 is stored in the overflow storage 806. The sequence status 802 is set to "Pending". The message will de facto not be processed. The sequencing will resume when a message with the expected message rank to be processed is received by an inbound handler. In that case the inbound handler will store the corresponding message in the storage queue and set sequence status to "Processing".

As for the process shown in FIGS. 8A-8D shown, when an outbound handler ends up working on a message, it will seek in the overflow storage 806, a message with a message rank matching the sequence rank (the sequence rank indicating the rank of the next message to process for maintaining the order of the sequence). If it is found, it is stored in the queue 850; if not, the sequence status is set either to "Pending" (if messages on this sequence exist in the overflow area, but with a rank not equal to the sequence rank) or "Waiting" (if no message for that sequence are in the overflow storage area).

Managing Sequence Locks and Time Outs

As described previously, the messages received for a given sequence are stored in overflow storage 806, as long as their message ranks are not matching the one to be processed. This is a lock situation for the whole sequence, as long as the next expected message to be processed is not received by an inbound handler.

In a particular embodiment, the present invention ensures that this lock situation is limited in time, if ever it is required by the process. The process also defines a global sequence time out value, expressed as a duration (in seconds, minutes, days, . . . ).

In another embodiment, the sequence context 802 may contain an absolute time value, defined as the sequence timeout. Each time an inbound handler or outbound handler has access to a given sequence context record, meaning it is processing in some way a message belonging to the sequence, which is an indication of activity on the sequence, this absolute time value is updated to a value being the sum of the current system time and the sequence timeout duration.

In yet another embodiment, a time out sequence collector may be implemented for regularly waking up and scanning the full list of sequence contexts. In this particular implementation, any sequence that has expired with regard to its sequence duration, is detected. This process makes use of the sequence time out values to achieve the selection.

Depending on the implementation, the method, apparatus and system according to the present invention can:

Erase any corresponding messages in the overflow storage 806 and in the sequence context 802;

Perform any adequate processing and logging for specific sequence expiration event:

deliver out of sync such as taking items in order, or ignoring item(s) while waiting for the one until is found), raise alarms . . .

There are many application of the present invention in data processing. But it is particularly suitable for:

Messaging server, such as Amadeus Messaging Server (AMS): wherein the application deals with persistent messaging, acting as a hub in an infrastructure of a company and more particularly a software company. In the booking or reservation industry, the AMS may be used by both as a reservation system, and a departure control system. The sequencing is enforced for all Teletype traffics. A Teletype message is usually referred to as TTY. A TTY type B is an airline industry standard for exchanging messages via asynchronous channels with strict order of processing for a given functional context. For instance, a first message contains a list of boarding passengers, a second list contains a list of suppressed passengers, a third list contains a list of added passengers. These lists of passengers have to follow in a strict order.

Another field of application is for instance the OTF high-level framework (OHF) which is a middleware software component used by a number of applications to implement guaranteed asynchronous delivery. The main usage of the sequencing with OHF is the synchronization occurring between the coupon database (CDB) and the electronic ticketing application. It often occurs that many changes are made to a single coupon in a limited time period. These changes must be forwarded in the correct order to the electronic ticket application or the coupon database in order to keep them synchronized.

While described above primarily in the context of travel solutions provided by airlines or air carriers, those skilled in the art should appreciate that the embodiments of this invention are not limited for use only with airlines, but could be adapted as well for use with other types of travel modalities and travel providers including, as non-limiting examples, providers of travel by ship, train, motorcar, bus and travel products such as hotels.

The foregoing description has provided by way of exemplary and non-limiting examples a full and informative description of various method, apparatus and software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent processes or algorithms and data representations may be attempted by those skilled in the art. Further, the various names used for the different elements, functions and algorithms (e.g., etc.) are merely descriptive and are not intended to be read in a limiting sense, as these various elements, functions and algorithms can be referred to by any suitable names. All such and similar modifications of the teachings of this invention will still fall within the scope of the embodiments of this invention.

Furthermore, some of the features of the exemplary embodiments of the present invention may be used to advantage without the corresponding use of other features. As such, the foregoing description should be considered as merely illustrative of the principles, teachings and embodiments of this invention, and not in limitation thereof.

Embodiments of the various techniques described herein may be implemented in digital electronic circuitry, in computer hardware, or handheld electronic device hardware, firmware, software, or in combinations of them. Embodiments may be implemented as a program or software product, i.e., a computer program tangibly embodied in an information carrier, e.g., in a machine-readable storage device or in a propagated signal, for execution by, or to control the operation of, data processing apparatus, e.g., a programmable processor, a computer, a tablet or multiple computers. A program, such as the computer program(s) described above, can be written in any form of programming language, including compiled or interpreted languages, and can be deployed in any form, including as a stand-alone program or as a module, component, subroutine, or other unit suitable for use in a computing environment. A program can be deployed to be executed on one computer or tablet or on multiple computers or tablets at one site or distributed across multiple sites and interconnected by a communication network or a wireless network.

Processors suitable for the execution of a computer program include, by way of example, both general and special purpose microprocessors, and any one or more processors of any kind of digital computer, tablet or electronic device. Generally, a processor will receive instructions and data from a read-only memory or a random access memory or both. Elements of a computer may include at least one processor for executing instructions and one or more memory devices for storing instructions and data. Generally, a computer or electronic device also may include, or be operatively coupled to receive data from or transfer data to, or both, one or more mass storage devices for storing data, e.g., magnetic, magneto-optical disks, or optical disks.

The program code embodying the software program instructions of various embodiments described herein is capable of being distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network, a wireless network or a telecommunication network. Examples of communication or telecommunication networks include a local area network (LAN) and a wide area network (WAN), e.g., the Internet or a wireless network such as a Wifi network.

While certain features of the described implementations have been illustrated herein, many modifications, substitutions, changes and equivalents will now occur to those skilled in the art. It is, therefore, to be understood that the appended claims are intended to cover all such modifications and changes as fall within the true spirit and the scope of the embodiments of the invention.

What we claim is:

1. A method of sequencing asynchronous messages in a distributed system having a plurality of inbound handlers and a plurality of outbound handlers, the method comprising:
   receiving, by a processor of one of the inbound handlers, an incoming message having a sequence correlation value, wherein the sequence correlation value identifies a sequence associated with the incoming message;
   checking, by the processor, a sequence status of said sequence in a sequence storage;
   determining, by the processor, a message rank indicating the order of the incoming message in said sequence;
   comparing, by the processor, the message rank to a sequence rank defining the rank of the next message to be processed for said sequence;
   if the message rank is equal to the sequence rank, determining, by the processor, the message is the next message to be processed for maintaining the order of the messages in said sequence;
   if the message rank is not equal to the sequence rank, determining, by the processor, the message is not the next message to be processed for maintaining the order of the messages in said sequence;
      if the sequence status indicates that the outbound handlers are not currently processing one of the messages of said sequence and if the incoming message is determined to be the next message to be processed for said sequence, forwarding, by the processor, the incoming message to a queue storage and subsequently forwarding the incoming message to one of the outbound handlers that becomes available for processing; and
      if the sequence status indicates that at least one of the outbound handlers in the plurality of outbound handlers is currently processing one of the messages of said sequence; or if the queue storage already comprises one of the messages of said sequence awaiting to be processed; or if the incoming message is determined not to be the next message to be processed for said sequence, storing, by the processor, the incoming message in a memory of an overflow storage to keep for further processing.

2. The method of claim 1 further comprising:
   incrementing, by the processor, the sequence rank of the sequence upon completion of the processing of one of the messages of the sequence.

3. The method of claim 2 further comprising:
   determining, by the processor, a given message in the overflow storage includes a message rank equal to the incremented sequence rank; and
   forwarding, by the processor, the given message to the queue storage.

4. The method of claim 1 further comprising:
   assigning, by the processor, an assigned message rank to the incoming message, wherein the assigned message rank indicates the rank of the incoming message in the sequence; and
   storing, by the processor, the assigned message rank in the sequence storage.

5. The method of claim 4 wherein the assigned message rank corresponds to the message rank of the last message received at any one of the inbound handlers for said sequence plus one increment.

6. The method of claim 1 wherein if the queue storage does not comprise any message for the sequence of the incoming message and if the message rank of the incoming message is greater than the sequence rank indicated in the sequence storage, storing, by the processor, the incoming message in the overflow storage until the sequence rank equals the message rank of the incoming message.

7. The method of claim 1 further comprising:
receiving, by the processor, an index with the incoming message,
wherein index indicates the message rank of the incoming message within the sequence.

8. The method of claim 1 further comprising:
processing one of the messages by one of the outbound handlers; and
removing the message from the storage queue.

9. The method of claim 1 wherein, the outbound handlers operate asynchronously, allowing thereby one of the outbound handlers to send one of the messages and to be available for another processing upon sending the message and before receiving an acknowledgment of response from a recipient of the message.

10. The method of claim 1 further comprising:
providing, by the processor, a delivery process associated with one of the outbound handlers, wherein the delivery process is configured to send one of the messages to a recipient;
providing, by the processor, an acknowledgement process associated with the outbound handler, wherein the acknowledgement process is configured to receive an acknowledgement receipt from the recipient; and
configuring the delivery process and the acknowledgement process to operate independently.

11. The method of claim 1 further comprising:
in response to receiving the incoming message, preventing, by the processor, the inbound handlers from receiving any messages associated with the sequence until the incoming message is stored in one of the sequence storage and the queue storage.

12. The method of claim 11 further comprising:
storing, by the processor, a mutex in the sequence storage, wherein the mutex is associated with the sequence; and
locking, by the processor, the mutex to prevent the inbound handlers from receiving any messages associated with the sequence.

13. The method of claim 1 further comprising:
determining, by the processor, one of the messages in the queue storage is available for processing;
retrieving, by the processor, the message from the queue storage; and
processing, by the processor, the message with one of the outbound handlers.

14. The method of claim 1, further comprising:
storing, by the processor, a mutex in the sequence storage, wherein the mutex is associated with the sequence; and
locking, by the processor, the mutex to while the incoming message is processed by one of the outbound handlers to prevent the other outbound handlers from processing any messages associated with the sequence.

15. The method of claim 14 further comprising
checking, by the processor, the queue storage to determine whether the mutex for the sequence of the incoming message is locked; and
retrieving the incoming message from the queue storage if the mutex is not locked.

16. The method of claim 1 further comprising:
sending, by the processor, an acknowledgement message from one of the inbound handlers upon storage of the incoming message in one of the sequence storage or the overflow storage.

17. The method of claim 1 wherein one of the messages having a message rank greater than the sequence rank is stored in the overflow storage to lock the message in the overflow storage while the message rank of the message is not matching equal to the sequence rank.

18. The method of claim 1 further comprising:
storing, by the processor, one of the messages in the overflow storage, wherein the message rank of the message is greater than the sequence rank;
assigning, by the processor, a time out value to one of the sequence and the message; and
discarding, by the processor, the message from the overflow storage when the time out value is reached.

19. A non-transitory computer-readable medium that contains software program instructions, where execution of the software program instructions by at least one data processor results in performance of operations that comprise execution of the method as in claim 1.

20. A distributed processing system for sequencing asynchronous messages comprising:
a plurality of inbound handlers, comprising at least one data processor, each of the plurality of inbound handlers being configured to receive independently a plurality of incoming messages pertaining to various sequences;
a plurality of outbound handlers, comprising at least one data processor, each of the plurality of outbound handlers being configured to process and forward independently the plurality of incoming messages; and
a storage layer comprising at least a memory and comprising:
a storage queue for storing incoming messages ready to be transmitted to the plurality of outbound handlers;
a sequence storage comprising:
a sequence status context for maintaining and updating a status for each sequence of the incoming messages; and
an overflow storage configured to receive the messages from the inbound handlers and to sequentially forward them to the queue storage;
wherein the system is configured to determine if an incoming message is the next message to be processed for maintaining the order of the messages in its sequence and to perform the following steps performed with at least one data processor;
if the sequence status indicates that the outbound handlers are not currently processing one of the messages of said sequence and if the incoming message is determined to be the next message to be processed for said sequence, forwarding, by the processor, the incoming message to the queue storage and subsequently forwarding the incoming message to one of the outbound handlers that becomes available for processing; and
if the sequence status indicates that at least one of the outbound handlers in the plurality of outbound handlers is currently processing one of the messages of said sequence; or if the queue storage already comprises one of the messages of said sequence awaiting to be processed; or if the incoming message is determined not to be the next message to be processed for said sequence, storing, by the processor, the incoming message in a memory of an overflow storage to keep for further processing.

21. The system of claim 20 wherein the storage queue and the sequence storage of the storage layer are implemented in one of an in-memory data, and a file base storage.

22. A computer-implemented travel monitoring method for processing a plurality of messages between at least one server application and at least one client application having a plurality of inbound handlers and a plurality of outbound handlers, the method comprising:
  receiving, by a processor of one of the inbound handlers, an incoming message having a sequence correlation value, wherein the sequence correlation value identifies a sequence associated with the incoming message;
  checking, by the processor, a sequence status of said sequence in a sequence storage;
  determining, by the processor, whether the incoming message is the next message to be processed for maintaining the order of the messages in said sequence;
    if the sequence status indicates that the outbound handlers are not currently processing one of the messages of said sequence and if the incoming message is determined to be the next message to be processed for said sequence, forwarding, by the processor, the incoming message to a queue storage and subsequently forwarding the incoming message to one of the outbound handlers that becomes available for processing; and
    if the sequence status indicates that at least one of the outbound handlers in the plurality of outbound handlers is currently processing one of the messages of said sequence; or if the queue storage already comprises one of the messages of said sequence awaiting to be processed; or if the incoming message is determined not to be the next message to be processed for said sequence, storing, by the processor, the incoming message in a memory of an overflow storage to keep for further processing; and
  wherein the plurality of messages comprise data related to at least one passenger of a transportation service and the sequence correlation values comprise data related to the transportation service.

23. The method of claim 22 further comprising:
  in response to processing a particular message in the plurality of messages, forwarding, by the processor, the particular message from one of the outbound handlers to a travel reservation system of the transportation service, a travel booking system of the transportation service, an inventory system of the transportation service, an electronic ticket system of the transportation service, a departure control system of the transportation service, or a combination thereof.

24. The method of claim 22 wherein the data related to the transportation service comprise
  a flight number
  a date
  a class reservation, or a combination thereof.

25. The method of claim 22 wherein the plurality of messages comprise data related to at least one boarding passengers, at least one cancelled passenger, at least one added passenger, or any combination thereof.

26. The method of claim 22 further comprising:
  providing, by the processor, a sequence time out value for a particular message in the plurality of messages;
  removing, by the processor, the particular messages from the overflow storage when the associated sequence time out value for the particular message is reached;
  starting, by the processor, the time elapsed in the sequence time out value from a
  departure time of a flight an expiration of a flight offer, an expiration of a promotion, or any combination thereof.

27. A computer-readable medium that contains software program instructions, where execution of the software program instructions by at least one data processor results in performance of operations that comprise execution of the method of claim 22.

28. A computer-implemented method of sequencing distributed asynchronous messages in a distributed system having a plurality of inbound handlers and a plurality of outbound handlers comprising at least one processor to process the messages, wherein the method comprising:
  receiving, by a processor, in one of the inbound handlers an incoming message with a sequence correlation value that identifies a sequence comprising the incoming message and determining a message rank indicating the order of the incoming message in said sequence;
  checking, by the processor, for a sequence status of said sequence in a sequence storage;
  if the sequence status indicates that the outbound handlers are not currently processing one of the messages of said sequence and if the incoming message as received is not provided with any index indicating the message rank within the sequence and the sequence storage does not already comprise any message to be processed for said sequence or if the incoming message as received is provided with an index indicating the message rank within the sequence, said message rank being equal to a sequence rank indicated in the sequence storage and defining the rank of the next message to be processed for said sequence, forwarding, by the processor, the incoming message to a queue storage and subsequently forwarding the incoming message to one of the outbound handlers that becomes available for processing; and
  if the sequence status indicates that at least one of the outbound handlers in the plurality of outbound handlers is currently processing one of the messages of said sequence; or if the queue storage already comprises one of the messages to be processed for said sequence; or if the incoming message as received is provided with an index indicating the message rank within the sequence, said message rank being greater than a sequence rank indicated in the sequence storage and defining the rank of the next message to be processed for said sequence, storing, by the processor, the incoming message in an overflow storage to keep for further processing.

* * * * *

UNITED STATES PATENT AND TRADEMARK OFFICE
CERTIFICATE OF CORRECTION

PATENT NO. : 8,903,767 B2  
APPLICATION NO. : 13/565284  
DATED : December 2, 2014  
INVENTOR(S) : Nicolas Krasensky et al.

Page 1 of 1

It is certified that error appears in the above-identified patent and that said Letters Patent is hereby corrected as shown below:

In the Claims:

At column 21, claim 14, line 57, after "mutex" delete "to"

At column 22, claim 17, line 10, before "equal" delete "matching"

At column 23, claim 24, line 52, change "comprise" to --comprising--

At column 23, claim 25, line 56, change "passengers" to --passenger--

At column 24, claim 26, line 11, after "flight" insert --,--

Signed and Sealed this
Twelfth Day of May, 2015

Michelle K. Lee
*Director of the United States Patent and Trademark Office*